United States Patent [19]
Noda et al.

[11] Patent Number: 6,073,537
[45] Date of Patent: Jun. 13, 2000

[54] ROLLER BUSH FOR FUEL INJECTION PUMP

[75] Inventors: Katsutoshi Noda, Nagoya; Sumio Kamiya, Toyota; Tatsuya Ichikawa, Kariya, all of Japan

[73] Assignee: Toyota Jidosha Kabushiki Kaisha, Japan

[21] Appl. No.: 08/908,385

[22] Filed: Aug. 7, 1997

[30] Foreign Application Priority Data

Aug. 8, 1996 [JP] Japan ..................................... 8-210064

[51] Int. Cl.⁷ ....................................................... F01B 3/00
[52] U.S. Cl. ............................... 92/31; 92/129; 384/907.1
[58] Field of Search .................................. 92/31, 80, 140, 92/116, 168, 129; 384/907.1; 123/495

[56] References Cited

U.S. PATENT DOCUMENTS

| | | | |
|---|---|---|---|
| 3,525,216 | 8/1970 | Phillips | 92/31 |
| 4,707,986 | 11/1987 | Takada et al | 60/323 |
| 4,941,319 | 7/1990 | Yamamoto et al | 60/314 |
| 5,030,065 | 7/1991 | Baumann | 417/273 |
| 5,063,887 | 11/1991 | Ozawa et al | 60/312 |
| 5,063,888 | 11/1991 | Ozawa | 60/312 |
| 5,366,401 | 11/1994 | Nanami et al | 440/89 |
| 5,647,779 | 7/1997 | Nanami | 440/89 |

FOREIGN PATENT DOCUMENTS 61-283759  12/1986  Japan .
63-151967  10/1988  Japan .

OTHER PUBLICATIONS

Patent Abstracts of Japan, vol. 096, No. 008 dated Apr. 30, 1996 (of JP 8–109960) (1 page).
European Search Report dated Jun. 30, 1998 (2 pages).
Communication dated Jul. 16, 1998 (1 page).
Information List (Form 1) (1 page).

Primary Examiner—Thomas E. Denion
Attorney, Agent, or Firm—Finnegan, Henderson, Farabow, Garrett & Dunner, L.L.P.

[57] ABSTRACT

A roller bush for a fuel injection pump is interposed between a metal roller and a pin. The roller is forced to contact with a cam reciprocating a plunger, and the pin supports the roller rotatably about a rotational axis at either axial side of the bush. Either axial end portions of the bush entirely consist of ceramic, each portions having the axial length from the corresponding axial end surface of L. The ratio of the axial length L to the entire axial length L0 of the bush is set to be equal to or larger than $\{(11-d)/16\}$, where d represents the inner diameter of the bush.

14 Claims, 3 Drawing Sheets

ROLLER BUSH FOR FUEL INJECTION PUMP

BACKGROUND OF THE INVENTION

1. Field of the Invention

The present invention relates to a roller bush for a fuel injection pump.

2. Description of the Related Art

Japanese Unexamined Utility Model Publication No. 63-151967 discloses a fuel injection pump having a cam reciprocating a plunger, a metal roller forced into contact with the cam, a pin supporting the roller rotatably about a rotational axis, and a bush interposed between the roller and the pin, the pin being supported at both axial sides of the bush. In the fuel injection pump, the bush comprises a metal having ceramic coatings covering the inner and outer surfaces. Namely, the ceramics coatings are interposed between the bush and the roller, and between the bush and the pin, which slide to each other, respectively, to suppress the seizure and the wear of the bush, the roller, and the pin, to thereby ensure the durability of the fuel injection pump as much as possible. Further, the ceramic is used in the form of a coating. This reduces the amount of the ceramic used, and thereby reduces the production cost of the fuel injection pump as much as possible.

However, the adhesion between a metal and a ceramic is generally low, and the relatively large force acting on the bush may separate the ceramic coatings therefrom. Especially, when the pin is supported at both axial sides of the bush, as mentioned above, a bend will occur at the center of the pin due to the force on the roller by the cam, and thereby a large force will act on the axial end portions of the roller and the bush. Such a large force may lead to the separation of the ceramic coatings and seizure, and thus the durability of the fuel injection pump may deteriorate.

SUMMARY OF THE INVENTION

An object of the present invention is to provide a roller bush for a fuel injection pump able to ensure good sliding between the bush and the roller or pin, to thereby ensure the durability of the fuel injection pump.

According to the present invention, there is provided a roller bush for a fuel injection pump having a cam reciprocating a plunger, a metal roller forced into contact with the cam, and a pin supporting the roller rotatably about a rotational axis, the bush being interposed between the roller and the pin, the pin being supported at both axial sides of the bush, wherein both axial end portions of the bush consist entirely of ceramic, each portions having the axial length from the corresponding axial end surface of L, and wherein a ratio of the axial length L to the entire axial length L0 of the bush is set to be equal to or larger than $\{(11-d)/16\}$, where d represents the inner diameter of the bush.

The present invention may be more fully understood from the description of the preferred embodiments of the invention as set forth below, together with the accompanying drawings.

DESCRIPTION OF THE PREFERRED EMBODIMENTS

Figure 1:
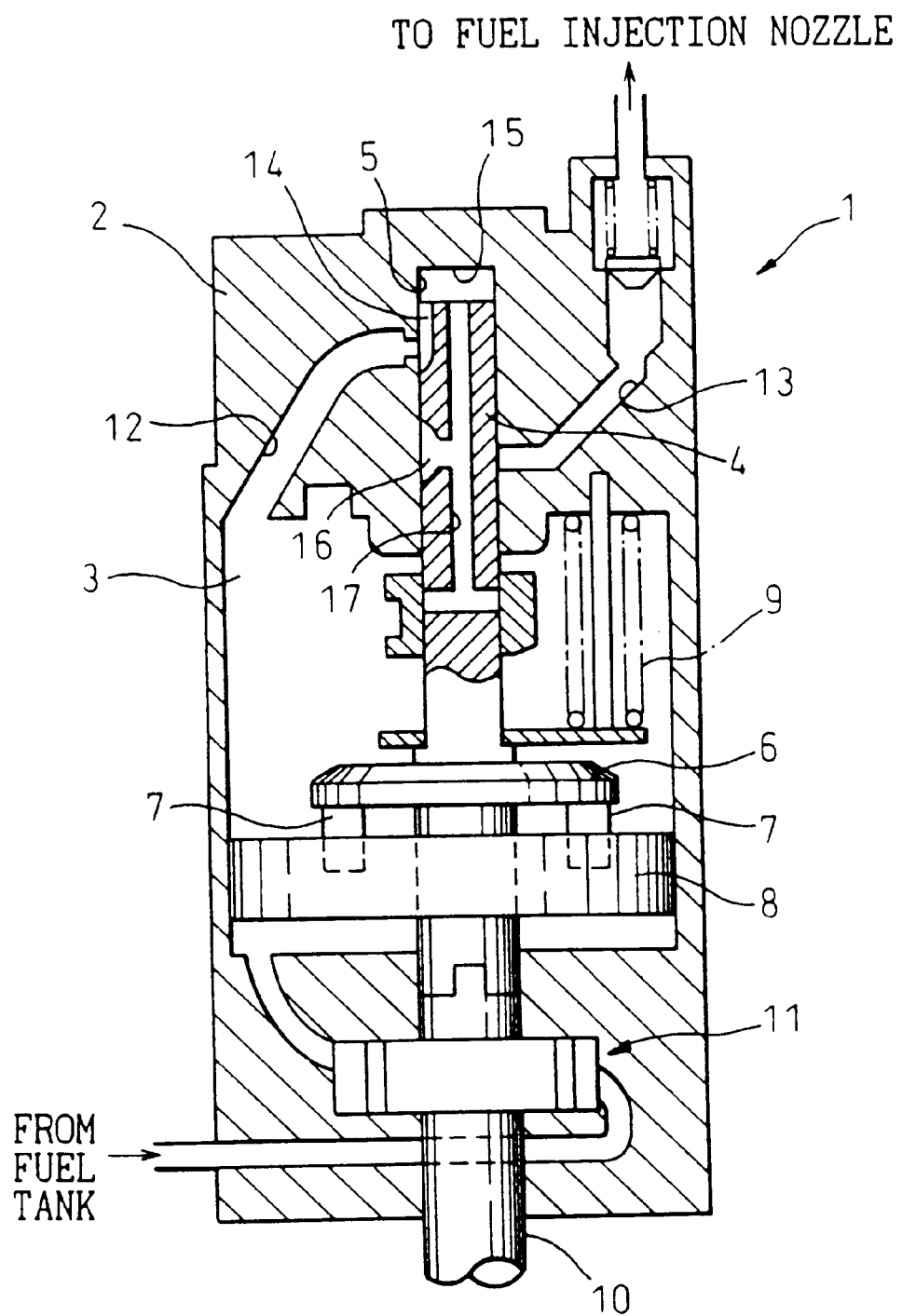
FIG. 1 is a general view of a fuel injection pump.

FIG. 1 illustrates the present invention applied to a roller bush for a fuel injection pump of a rotary distributor type for a diesel engine. Alternatively, the present invention may be applied to a bush for a fuel injection pump of another type, such as an in-line pump or a camshaftless pump.

Referring to FIG. 1, a reference numeral 1 designates a fuel injection pump, 2 designates a housing, 3 designates a pump chamber filled with the fuel, i.e., gas oil, 4 designates a plunger slidably inserted in a plunger insertion aperture 5 formed in the housing 2, 6 designates a face cam integral with the plunger 4, 7 designates a roller assembly rotatably supported by a roller ring 8 and forced into contact with the face cam 6, 9 designates a compression spring biassing the face cam 6 to the roller assembly 7, 10 designates a drive shaft driven by, for example, the engine and connected to the plunger 4, and 11 designates a feed pump driven by the drive shaft 10.

The inlet of the feed pump 11 is connected to a fuel tank (not shown), and the outlet of the feed pump 11 is connected to the chamber 3. The plunger insertion aperture 5 is connected, on one hand, to the chamber 3 via a fuel inlet passage 12, and on the other hand, to fuel injection nozzles (not shown) via corresponding fuel distribution passages 13. A fuel distribution passage 13 is provided for each fuel injection nozzle, but only one is depicted in FIG. 1.

When the shaft 10 is rotated and the feed pump 11 is driven, the fuel in the fuel tank is pumped and fed into the chamber 3. At this time, the plunger 4 rotates about its rotational axis, and when a suction port 14 of the plunger 4 communicates with the fuel inlet passage 12, the fuel in the chamber 3 flows into a high-pressure chamber 15 defined between the plunger insertion aperture 5 and the top of the plunger 4. Then, when the plunger 4 further rotates, the suction port 14 is isolated from the fuel inlet passage 12, and a distribution port 16 of the plunger 4 communicates with the distribution passage 13. At this time, the cam of the face cam 6 acts on the roller assembly 7, and thus the plunger 4 moves upwardly along its axis. As a result, the fuel in the high pressure chamber 15 is compressed and fed to the distribution passage 13, via a fuel passage 17 formed in the plunger 4 and the distribution port 16, and then is injected from the corresponding fuel injection nozzle.

Namely, the rotation of the shaft 10 rotates the plunger 4 and the face cam 6 about its rotational axis, and, simultaneously, reciprocates the plunger 4 along its axis.

Figure 2:
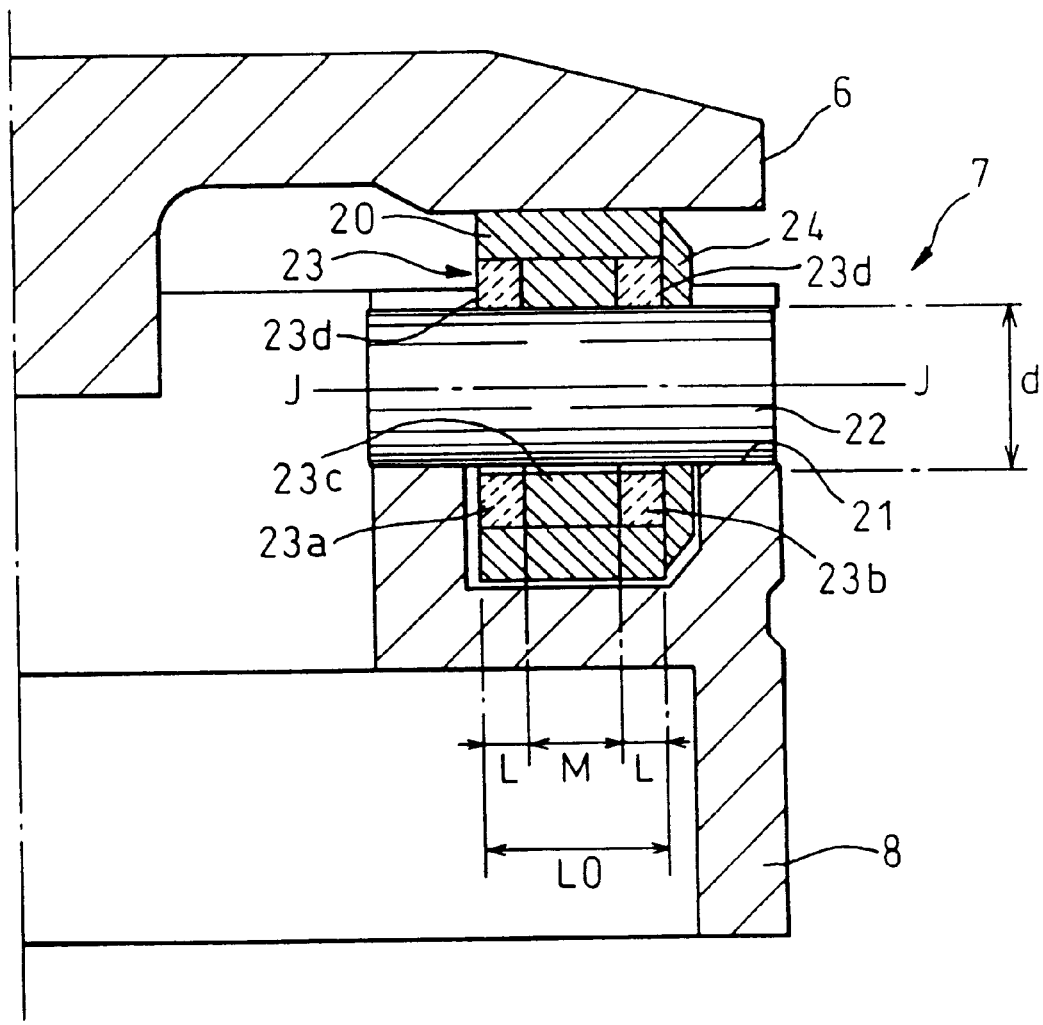
FIG. 2 is a partial, enlarged cross-sectional view of a roller assembly.
Figure 3:
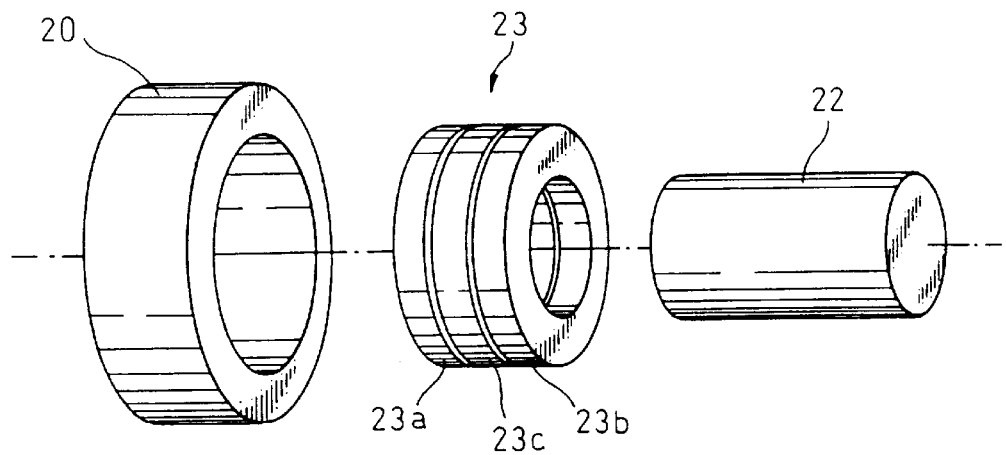
FIG. 3 is an exploded, perspective view of the roller assembly.

Next, the detailed explanation for the roller assembly 7 will be made, referring to FIGS. 2 and 3. Referring to FIGS. 2 and 3, the roller assembly 7 comprises a roller 20 with an inner space, a pin 22 rotatably received in receiving slots 21 formed in the ring 8 and extending through the inner space of the roller 20, and an annular roller bush 23 interposed between the roller 20 and the pin 22. The roller 20 is supported by the pin 22 rotatably about the rotational axis J—J, and the pin 22 is supported by the ring 8 at the either axial sides of the bush 23. The either axial end portions 23a and 23b of the bush 23 consist entirely of ceramic, each portions 23a, 23b having the axial length from the corresponding axial end surface of L. Between the ceramic portions 23a and 23b, an intermediate portion 23c may be arranged, if required. Note that the numeral 24 in FIG. 2 designates a washer for aligning the roller 20 and the bush 23 with each other.

The axial length L of each ceramic portion 23a, 23b is set to satisfy the following inequality:

$$L/L0 \geq (11-d)/16$$

where L0 represents the entire axial length of the bush 23, and d represents the inner diameter of the bush 23. The inventors of the present invention have found that the ceramic portions 23a and 23b having the axial length of L satisfying the above inequality prevents the seizure between the bush 23 and the roller 23, and between the bush 23 and the pin 22, and suppresses the wear of the bush 23, the roller 20, and the pin 22, to thereby ensure the good durability of the fuel injection pump.

While the ceramic portion 23a and 23b may consist of any ceramic, silicon nitride ($Si_3N_4$) or zirconia ($ZrO_2$) is preferable, and silicon nitride having a four-point flexural strength, under JIS R1601, of 800 MPa or more, is more preferable.

While the roller 20 may consist of any metal, the bearing steel is preferable, and the bearing steel JIS SUJ2 is more preferable. Also, for the face cam 6 and pin 22, the bearing steel is preferable, and the bearing steel JIS SUJ2 is more preferable.

The intermediate portion 23c is for making the entire axial length L0 of the bush 23 equal to that of the roller 20. The portion 23c may consist of any material, such as metal only, metal with a ceramic coating, or ceramic only. In this case, silicon nitride is preferable for the ceramic, and bearing steel is preferable for the metal.

On the other hand, when the shaft 10 rotates and thereby the face cam 6 rotates, the roller 20 rolls with respect to the face cam 6, and slides with respect to the bush 23. Further, the bush 23 slides with respect to the pin 22. As a result, the roller 20 rotates about the rotational axis J—J. Note that the pin 22 hardly rotate with respect to the ring 8.

In a fuel injection pump in which the roller is supported at the either axial sides of the bush, if the fuel injection pressure is made higher, the face cam will act with a large force on the roller. However, if the large force bends the center of the pin, undesired stress concentrated portions may exist at the axial end portions of the bush. In the present embodiment, the ceramic portions 23a and 23b are provided at the axial end portions of the bush 23, and the portions 23a and 23b consist of a ceramic having a high fracture strength. In other words, at the axial ends of the bush 23, the material for the roller 20 and that for the bush 23 are different from each other, and the material for the bush 23 and that for the pin 22 are different from each other. Also, the ceramic portions 23a and 23b do not comprise metal coated with a ceramic coating, but consist entirely of ceramic. Therefore, seizure and remarkable or rapid wear of the bush 23, the roller 23, and the pin 22, around the either axial ends of the bush 23, is prevented. Accordingly, good durability of the fuel injection pump 1 can be ensured, while the fuel injection pressure can be made higher. The higher injection pressure will provide good atomization of the fuel, and thereby good combustion.

Note that the ceramic portions 23a and 23b and the intermediate portion 23c are not necessarily connected to each other. Further, each ceramic portion 23a, 23b may be formed of a single piece, or in a stack of a plurality of pieces having the total axial length of L.

In the fuel injection pump 1, the lubrication between the elements of the roller assembly 7, i.e., between the face cam 6 and the roller 20, between the roller 20 and the bush 23, and between the bush 23 and the pin 22, is performed by the fuel in the chamber 3. In this case, it is known that a sulfuric composition in the fuel enhances the lubrication. However, it becomes more preferable as the amount of the specific sulfuric composition contained in the fuel becomes smaller, considering the emission of the exhaust gas of the engine. In the present embodiment, the seizure and the remarkable wear of the elements of the roller assembly 7 are prevented, and thus, the good durability of the fuel injection pump 1 is ensured, even if a fuel containing little or no specific sulfuric composition is used.

Note that, in the prior art where the ceramic member and the metal member slide with each other, the surface roughness of the ceramic member is set under about 0.3 $\mu$mRz, to prevent the remarkable wear of the metal member. Contrarily, in the present embodiment, the surface roughness of the ceramic portion 23a, 23b is set about 0.5 to 1.6 $\mu$mRz. The inventors of the present invention have found that the remarkable wear of the metal counter member, i.e., the roller 20 and the pin 22, is prevented, when the surface roughness of the ceramic portion 23a, 23b is set about 0.5 to 1.6 $\mu$mRz.

EXAMPLES 1 TO 7 AND COMPARATIVE EXAMPLES 1 TO 3

The Examples 1 to 7 and the Comparative Examples 1 to 3 were constructed as shown in Table 1.

TABLE 1

| | d (mm) | D (mm) | L (mm) | M (mm) | L/L0 (–) |
|---|---|---|---|---|---|
| Example 1 | | | 2 | 4 | 2/8 |
| Example 2 | | | 3 | 2 | 3/8 |
| Example 3 | 7 | 11 | 4 | 0 | 4/8 |
| Comparative Example 1 | | | 1 | 6 | 1/8 |
| Example 4 | | | 1 | 6 | 1/8 |
| Example 5 | 9 | 13 | 4 | 0 | 4/8 |
| Comparative Example 2 | | | 0.5 | 7 | 0.5/8 |
| Example 6 | | | 3 | 2 | 3/8 |
| Example 7 | 5 | 9 | 4 | 0 | 4/8 |
| Comparative Example 3 | | | 2 | 4 | 2/8 |

In the Table 1, D represents the outer diameter of the bush 23, and M represents the axial length of the intermediate portion 23c, and equals to (L0–2L) (see FIG. 2). In each example and comparative example, the entire axial length L0 of the bush 23 was set 8 (mm). Note that "M=0" in the Examples 3, 5, and 7 indicates that there is no intermediate portion 23.

In each example and comparative example, the ceramic portions 23a and 23b consisted of silicon nitride, and the intermediate portion 23c consisted of the bearing steel JIS SUJ2 with a ceramic coating of silicon nitride having a thickness of 20 $\mu$m.

In each example and comparative example, the bush 23 was assembled with the face cam 6, the roller 20, the pin 22, and the washer 24, all of which consisted of the bearing steel JIS SUJ2, into the roller assembly 7. A clearance of 70 $\mu$m was provided between the roller 20 and the bush 23, and a clearance of 50 $\mu$m was provided between the bush 23 and the pin 22.

Test 1

Four sets of the roller assemblies 7 constructed in the above manner were prepared, and were arranged in the ring 8. Then, the ring 8 was rotated in a gas oil at 90° C., with a load on the face cam 6 of 2,000 kN. The ring 8 was rotated for 30 sec at 2,400 rpm, and then stopped for 10 sec, and these operations were repeated for 20 hours. After the test, the roller assembly 7 was dissembled, and the sliding surfaces of the roller 20, the bush 23, and the pin 22 were observed.

Table 2 shows the results.

TABLE 2

|  | Result |
|---|---|
| Example 1 | ○ |
| Example 2 | ○ |
| Example 3 | ○ |
| Comparative Example 1 | x |
| Example 4 | ○ |
| Example 5 | ○ |
| Comparative Example 2 | x |
| Example 6 | ○ |
| Example 7 | ○ |
| Comparative Example 3 | x |

In Table 2, a circle represents a case where seizure was not observed and a cross represents a case where seizure was observed. It can be seen that seizure was not observed in the Examples 1 to 7, but was observed in the Comparative Examples 1 to 3.

Figure 4:
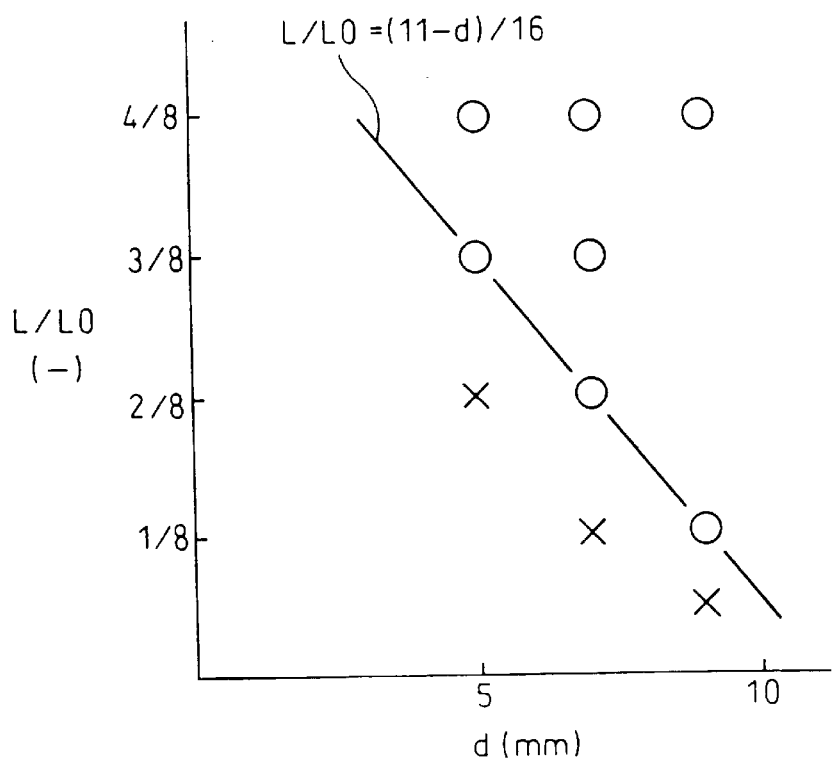
FIG. 4 is a diagram illustrating experimental results.

FIG. 4 illustrates the relationships between the ratio L/L0 and the inner diameter d of the Examples 1 to 7 and the Comparative Examples 1 to 3 and, in FIG. 4, a circle represents Examples 1 to 7 where the seizure was not observed anal a cross represents Comparative Examples 1 to 3 where the seizure was observed. To prevent the seizure, it is necessary for the ratio L/L0 to become larger, as the inner diameter d of the bush 23 becomes smaller, as can be seen in FIG. 4. It is considered that this is because the shear stress acting on the bush 23 becomes larger as the inner diameter d becomes smaller, and thus it is necessary for the ratio of the ceramic portion to the entire bush 23 to be made larger, as the inner diameter d becomes smaller.

Especially, seizure is prevented when the ratio L/L0 satisfies the following inequality:

$$L/L0 \geq (11-d)/16$$

Accordingly, setting the axial length of the ceramic portions 23a and 23b to satisfy the above inequality ensures the good durability of the fuel injection pump 1.

EXAMPLE 8 AND COMPARATIVE EXAMPLES 4 AND 5

The Example 8 and the Comparative Examples 4 and 5 were constructed as shown in Table 3.

TABLE 3

|  | d (mm) | D (mm) | Material for Bush |
|---|---|---|---|
| Example 8 |  |  | Ceramic |
| Comparative Example 4 | 7 | 11 | Metal + Ceramic Coating |
| Comparative Example 5 |  |  | Metal |

Each bush 23 was formed as a single piece having an entire axial length of 8 (mm). In this case, the ratio L/L0 equals to 1/2, and satisfies the above inequality. Silicon nitride was used as the ceramic material in the Example 8 and the Comparative Example 4, and bearing steel JIS SUJ2 was used as the metal material in Comparative Examples 4 and 5. The thickness of the ceramic coating in Comparative Example 4 was 20 μm.

The bush 23 was assembled with the face cam 6, the roller 20, the pin 22, and the washer 24, all of which consisted of the bearing steel JIS SUJ2, into the roller assembly 7. A clearance of 70 μm was provided between the roller 20 and the bush 23 and a clearance of 50 μm was provided between the bush 23 and the pin 22.

Test 2

Four sets of the roller assemblies 7 constructed in the above manner were prepared, and were arranged in the ring 8. Then, the ring 8 was rotated in a gas oil at 90° C., with a load on the face cam 6 of 2,000 kN. The ring 8 was rotated for 30 sec at 2,400 rpm, and then stopped for 10 sec, and these operations were repeated for 20 hours. After the test, the roller assembly 7 was dissembled, and the sliding surfaces of the roller 20, the bush 23, and the pin 22 were observed.

Table 4 shows the results.

TABLE 4

|  | Result | |
|---|---|---|
|  | Load: 1000 kN | Load: 2000 kN |
| Example 8 | ○ | ○ |
| Comparative Example 4 | ○ | x |
| Comparative Example 5 | x | (Not performed) |

In Table 4, a circle represents a case where seizure was not observed and a cross represents a case where seizure was observed. It can be seen that seizure was not observed in Example 8, but was observed in Comparative Examples 4 and 5. In particular, in Comparative Example 4, it was observed that the ceramic coating separated from the inner surface of the bush around the either axial ends of the bush, and that seizure occurred between this separated portion and the pin. Further, in Comparative Example 5, seizure was observed between the outer surface of the bush and the pin, and between the inner surface of the bush and the roller.

According to the present invention, it is possible to provide a bush for a roller for a fuel injection pump able to ensure good sliding between the bush and the roller or pin, to thereby ensure the durability of the fuel injection pump.

While the invention has been described by reference to specific embodiments chosen for purposes of illustration, it should be apparent that numerous modifications could be made thereto by those skilled in the art without departing from the basic concept and scope of the invention.

We claim:

1. A roller bush for a fuel injection pump having a cam reciprocating a plunger, a metal roller forced to contact with the cam, and a pin supporting the roller rotatably about a rotational axis, the bush being interposed between the roller and the pin, the pin being supported at the either axial sides of the bush, wherein the axial end portions of the bush consist entirely of ceramic, each portion having an axial length from the corresponding axial end surface of L, and wherein a ratio of the axial length L to the entire axial length L0 of the bush is set to be equal to or larger than {(11−d)/16}, where d represents the inner diameter of the bush.

2. A roller bush according to claim 1, wherein the axial length of the bush substantially equals that of the roller.

3. A roller bush according to claim 1, wherein the bush comprises an intermediate portion arranged between the ceramic portions.

4. A roller bush according to claim 3, wherein the intermediate portion comprises a metal having a ceramic coating.

5. A roller bush according to claim 1, wherein the ceramic portions consist of one of silicon nitride and zirconia.

6. A roller bush according to claim 5, wherein the ceramic portions consist of silicon nitride having a four-point flexural strength under JIS R1601 of 800 MPa or more.

7. A roller bush according to claim 1, wherein the surface roughness of each ceramic portion is set to about 0.5 to 1.6 μmRz.

8. A roller bush according to claim 1, wherein the roller consists of the bearing steel.

9. A roller bush according to claim 1, wherein the pin consists of metal.

10. A roller bush according to claim 9, wherein the pin consists of the bearing steel.

11. A roller bush according to claim 1, wherein the ratio L/L0 is set to 1/2 and the entire bush consists of ceramic.

12. A roller bush according to claim 11, wherein the bush is formed of a single piece.

13. A roller bush according to claim 1, wherein the fuel injection pump is of the rotary distributor type.

14. A roller bush according to claim 1, wherein the fuel injection pump is adapted for a diesel engine.

* * * * *